United States Patent [19]

Voitko

[11] 4,226,093

[45] Oct. 7, 1980

[54] RAPID-FREEZING APPARATUS FOR FOOD PRODUCTS

[76] Inventor: Andrei M. Voitko, Studencheskaya ulitsa, 12, korpus 1, kv. 64, Kishinev, U.S.S.R.

[21] Appl. No.: 4,836

[22] Filed: Jan. 19, 1979

[30] Foreign Application Priority Data

Feb. 1, 1978 [SU] U.S.S.R. .............................. 2576361

[51] Int. Cl.³ ........................................ F25D 25/02
[52] U.S. Cl. ...................................... 62/381; 198/778
[58] Field of Search ........................... 62/381; 198/778

[56] References Cited

U.S. PATENT DOCUMENTS

| | | | |
|---|---|---|---|
| 3,133,798 | 5/1964 | Feld et al. ............................ | 198/778 |
| 3,169,381 | 2/1965 | Persson ................................ | 62/57 |
| 3,240,316 | 3/1966 | Huffman et al. ...................... | 198/778 |
| 3,348,659 | 10/1967 | Roinestad ............................ | 198/778 |
| 3,982,404 | 9/1976 | Overbye ............................. | 62/57 |

*Primary Examiner*—Ronald C. Capossela
*Attorney, Agent, or Firm*—Fleit & Jacobson

[57] ABSTRACT

A rapid-freezing apparatus, comprising a refrigeration chamber accomodating a conveying mechanism for partly prepared and ready-made food products to be frozen, a fan and an air cooler. According to the invention, the conveying mechanism for partly prepared and ready-made food products is a multi-level conveyer comprising two vertical rotatable supports which drive a flexible traction member. Around the flexible traction member is mounted a helical monorail of the conveyer. Bearing upon the monorail are screen trays for products to be frozen, provided with rollers and attached to the flexible traction member by clamps.

4 Claims, 3 Drawing Figures

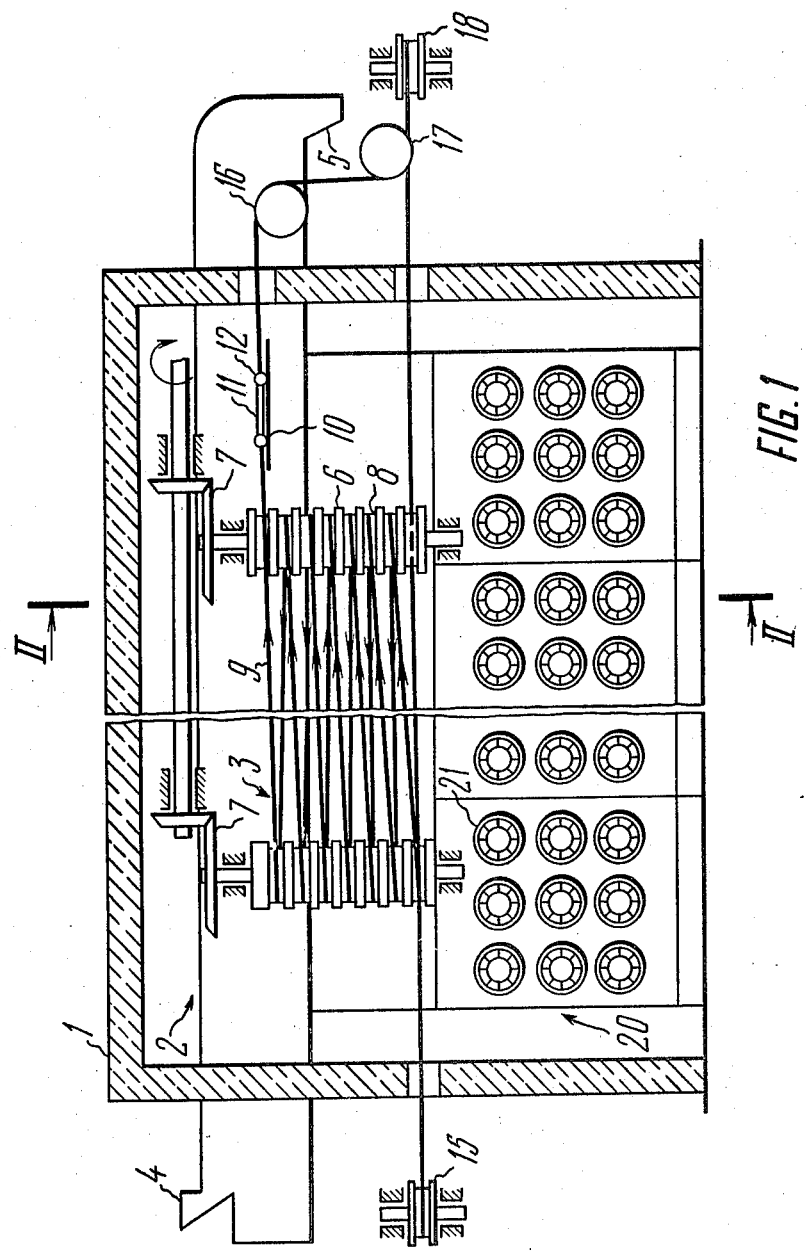

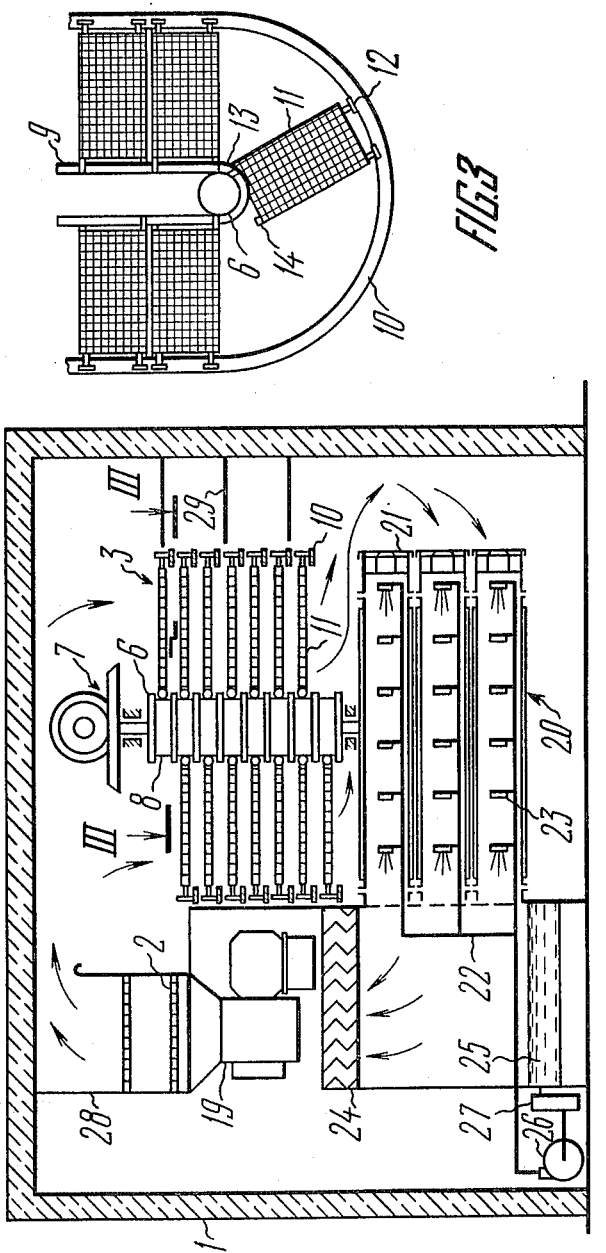

RAPID-FREEZING APPARATUS FOR FOOD PRODUCTS

BACKGROUND OF THE INVENTION

1. Field of the Invention

The present invention relates to refrigerating engineering and more particularly to rapid-freezing apparatus for food-products.

The invention can be employed in the food industry and in agriculture for deep-freezing of food products, mainly fruit, vegetables, berries, partly prepared and ready-made food products.

2. Description of the Prior Art

Known in the art are rapid-freezing apparatus for freezing fruit, vegetables and berries (c.f. "Flofreeze", model M, Model W, in the catalog of Frigoscandia, Sweden), comprising means for conveying fruit, vegetables and berries to be frozen, an air cooler and fans mounted in the refrigeration chamber, as well as feeding and delivery means located outside the refrigeration chamber.

Also known in the art are rapid-freezing apparatus for partly prepared and ready-made food products (c.f. "Gyrofreeze" and "Cartofreeze" in catalogs of Frigoscandia, Sweden; "Automatic tunnel TD" in the catalog of Polimex-Cekop, Poland).

The latter group of rapid-freezing apparatus differs from the former one in the construction of the means for conveying product to be frozen.

Both groups of the above rapid-freezing apparatus offer refrigeration of a limited range of products. If it is necessary to freeze different kinds of products, the employment of said rapid-freezing apparatus entails considerably greater investments for their construction, a larger amount of production space and higher power consumption.

Well known in the art are rapid-freezing apparatus for food products suitable for deep-freezing both of fruit, vegetables and berries, and of partly prepared and readymade food products (cf. U.S. Pat. Nos. 3,169,381 and 3,982,404).

Said group of rapid-freezing apparatus includes ZFT-1 apparatus manufactured by Polimex-Cekop, Poland, and registered in the PPR Patent Office under Nos. NP-137, 734 and N20,578.

This rapid-freezing apparatus for food products comprises a refrigeration chamber accomodating means for conveying fruit, vegetables and berries to be frozen, means for conveying partly prepared and ready-made food-products, fans and an air cooler.

The means for conveying fruit, vegetables and berries is a two-section single-level screen conveyor. The two sections of said conveyer are arranged after one another, the velocity of the motion of the screen belts in the first section being higher than that of the screen belt of the second section located at the exit of said rapid-freezing apparatus.

The feed bunkers cooperating with and delivering products to the aforedescribed screen conveyer are located outside the refrigeration chamber.

Under said screen conveyor there are located ribbed-pipe air-coolers and fans providing air circulation. Alongside of the screen conveyer, throughout the entire length of the rapid-freezing apparatus, there extends a tunnel in which racks supporting partly prepared and ready-made food products are shifted manually. Said racks are rolled into the cooling chamber at one side of the rapid-freezing apparatus and rolled out from its opposite side.

The above rapid-freezing apparatus operates as follows. Fruit, vegetables or berries are loaded into the feed bunker and then distributed evenly over the whole width of the screen belt of the first section of the conveyor and fed into the refrigeration chamber. Under the action of the cooled air flow from below, the fruit, vegetables or berries get enveloped by the cooled air on all sides and form a fluidised bed on the screen belt.

The fruit, vegetables or berries are continuously agitated and frozen. The freezing process continues when the fruits, vegetables or berries are on the screen belt of the second section of the conveyer. Upon emerging from the refrigeration chamber, the frozen fruit, vegetables or berries are discharged into the delivery bunker.

Warmed up by the heat released by the frozen product, the air is sucked in by the fans and directed into the air cooler wherein it is cooled and fed again under the screen belt of said conveyer.

Partly prepared or ready-made food products are frozen in the following manner. The food products are placed on the racks whereupon the latter are rolled into the tunnel. When the tunnel is filled, the fans and air coolers are turned on, providing air circulation and thus refrigeration. When said products become frozen, the racks are rolled out from the tunnel. At this time the conveying means for fruit, vegetables or berries to be frozen is not loaded, and the cooled air passes freely through the screen conveyer.

The above rapid-freezing apparatus has a low efficiency when refrigerating partly prepared or ready-made food products because the charging of the product to be frozen and discharging of the frozen product is carried out intermittently, with cyclic recurrence of the operation.

SUMMARY OF THE INVENTION

The principle object of the present invention is the provision of a rapid-freezing apparatus for food products, the efficiency of which is increased due to an improved construction of the apparatus which provides an uninterrupted process of freezing of partly prepared and ready-made food products.

This and other objects of the invention are attained in that in a rapid-freezing apparatus for food products, comprising a refrigeration chamber accomodating means for conveying partly prepared and ready-made food products to be frozen, an air cooler and at least one fan circulating the air passed through the air cooler, according to the invention, the means for conveying partly prepared and ready-made food products includes a multi-level conveyer comprising at least two vertical rotatable supports embraced by a flexible traction member to which there are secured a plurality of screen trays for partly prepared and ready-made food products, and a helical monorail disposed around said supports, with said screen trays engaging by means of their rollers said monorail for movement therealong.

The aforedescribed construction of a rapid-freezing apparatus offers a continuous process of refrigeration of partly prepared and ready-made food products, thereby increasing the efficiency of the apparatus.

BRIEF DESCRIPTION OF DRAWINGS

The nature of the present invention will be apparent from the following description of its specific embodiments taken in conjunction with the accompanying drawings wherein:

FIG. 1 is a longitudinal sectional view of the rapid freezing apparatus, according to the invention;

FIG. 2 is a sectional view taken along line II—II of FIG. 1;

FIG. 3 is a sectional view, taken along line III—III of FIG. 2.

DETAILED DESCRIPTION OF THE INVENTION

A rapid-freezing apparatus for food products according to the preferred embodiment, comprises a refrigeration chamber 1 (FIG. 1) accomodating a means 2 for conveying fruit, vegetables or berries to be frozen, and means 3 for conveying partly prepared and ready-made food products to be frozen.

The means 2 for conveying fruit, vegetables or berries is a single-stage screen conveyer. Bunkers 4 and 5 are intended, respectively, for feeding the product onto the conveyer and for delivering the frozen fruit, vegetables or berries.

According to the invention, the conveying means 3 is a multi-level conveyer comprising vertical supports 6 which are rotatable by a motor (not shown in drawings) through a bevel gearing 7 known in the art. The supports 6 have slots 8 into which a flexible traction member 9 is passed, for instance, a rope. A helical monorail 10 (FIG. 2) is mounted around the supports with the flexible traction member 9.

According to the invention, the multi-level conveyer is provided with screen trays 11 (FIG. 1). In the presently described embodiment of the invention, the screen trays are of a rectangular shape. On one side of each of the screen trays 11 there are mounted rollers 12 (FIG. 3) engaging the monorail 10. By means of a clamp 13 each of the trays 11 is attached to the flexible traction member 9 so that when passing around one of the vertical supports 6, the flexible traction member 9 may change the direction of its motion through 180° without getting out from the slot 8, i.e., practically it may be considered that the trays 11 are rigidly fastened to the flexible traction member 9 at one point.

Mounted on the same side of the screen tray 11 is a rest 14 by means of which the tray 11 bears upon the flexible traction member 9 during its linear motion.

The withdrawal of the screen trays 11 from the refrigeration chamber 1, e.g. for their cleaning, loading or unloading is effected by pulleys 15, 16, 17 and 18, also embraced by the flexible traction member 9.

In the refrigeration chamber 1 (FIG. 1) there is also mounted a centrifugal fan 19 for effecting air circulation. The rapid-freezing apparatus for food products comprizes an air cooler in the form of vortex-type heat exchangers 20. The number of the centrifugal fans 19 and of the heat exchangers 20 depends on the specific conditions under which the rapid-freezing apparatus for food products is employed and on the specific modification of its embodiment.

The design of the vortex-type heat exchangers 20 (the tube-in-tube type) is known per se to those competent in the art: as shown in FIG. 1, said heat exchanger has a turbulizer 21, intended for turbulizing the air flow fed into the heat exchanger. The space between the tubes of the heat exchanger 20 is filled with the refrigerant.

The vortex-type heat exchanger 20 has a sprayer for atomizing an antifreezing agent or antifreeze in the cooled air. The sprayer includes a manifold 22 having nozzles 23 indexed in the direction of the air flow in the heat exchanger 20.

At the outlet of the heat exchanger 20, there is mounted a device 24 for separating antifreeze drops from the cooled air. The device includes a screen box filled with ceramic rings or plastic chips or some other similar material.

Under the device 24 there is arranged a drip-pan 25 for collecting antifreeze drops the supply of which from the drip-pan 25 to the manifold 22 is effected by means of a pump 26. Shown in the drawing is also a filter 27 which is installed if necessary.

As shown in FIG. 2, the refrigeration chamber 1 is divided by a partition 28 into a low-pressure zone and a high-pressure zone. The low-pressure zone accommodates the centrifugal fan 19, the device 24 for separating antifreeze drops from the cooled air, the drip-pan 25, a pump 26 and a filter 27. The rest of the units of the apparatus are located in the high-pressure zone.

To prevent the cooled air from passing between the trays 11 and the wall of the refrigeration chamber 1 there are provided partitions 29.

The operation of the proposed rapid-freezing apparatus for food products operates as follows.

When fruit, vegetables or berries are being frozen, the centrifugal fan 19 feeds air from the low-pressure zone under the screen conveyer of which the upper run carries the product to be frozen. Passing through the layer of the fruit, vegetables or berries, the air blown by the centrifugal fan, effects the deep-freezing of the product and, at the same time, becomes itself heated.

The heated air enters the low-pressure zone and, after passing through the screen trays 11 of the multi-level conveyer, is sucked into the turbulizers 21 of the vortex-type heat exchangers 20. The turbulizers 21 turbulize the air flow which, on passing through the heat exchangers 20, cools down, giving up its heat to the refrigerant which boils in the intertube space of each of the heat exchangers.

An antifreeze intended for intensifying the heat transfer and preventing frost formation, is sprayed into the cooled air through the nozzles 23.

The circulation of the antifreze is effected by means of the pump 26 at the suction end of which the filter 27 is mounted. When the antifreeze and the air get into contact, the concentration of the antifreeze decreases. Consequently, to maintain a constant concentration of the antifreeze, some part of the antifreeze is bled and fed into a concentrator (not shown in the drawings).

After passing through the device 24 for separating the antifreeze, the cooled air is sucked in by the centrifugal fan 19; it flows then through the layer of the product, freezing the latter. It should be pointed out that the construction of the aforedescribed rapid-freezing apparatus for food products provides refrigeration of fruit, vegetables and berries either in a fluidised bed or in a dense layer. This is attained by appropriate air feed rate control, depending on the kind of the product to be frozen.

The freezing of partly prepared and ready-made food products can be carried out either concurrently with fruits, vegetable and berries or separately.

Partly prepared and ready-made food products to be frozen are placed onto the cleaned-up and dried screen trays 11 and distributed so as to provide spaces between individual pieces, to let the air pass between them.

The vertical rotating supports 6 actuate the flexible traction member 9 which, in turn, hauls the perforated trays 11, the rollers 12 of which are running on the spiral monorail 10. The direction of the movement of the traction member 9 is so selected that the screen trays 11 carrying the product to be frozen should move upwards, passing on from one level of the multi-level conveyer onto another one.

Passing downward through the screen trays 11, the cooled air freezes the product placed on the trays. Thus, the product to be frozen moves in the direction opposite to that of the cooled air.

The employment of the disclosed aforedescribed rapid-freezing apparatus for food products allows the expenses for the construction of refrigerator buildings to be decreased, the quality of the product subjected to freezing to be improved, and the operation costs to be brought down due to the continuity of the process and the mechanization of the conveying.

The above described specific embodiment of the invention is meant as an illustration into which various changes and modifications can be introduced without departing from the spirit and scope of the invention, as defined in the claims to follow.

What is claimed is:

1. A rapid-freezing apparatus for food products, comprising a refrigeration chamber, conveying means for partly prepared and ready-made food products accommodated in said refrigeration chamber and including a multi-level conveyer comprising at least two rotatable vertical supports, a flexible traction member running about said rotatable vertical supports, a helical monorail extending about said rotatable vertical supports encompassed by said flexible traction member, a plurality of screen trays attached to said flexible traction member, said screen trays having rollers engaging said helical monorail for motion therealong, an air cooler, and a fan adapted for circulating the air passed through said air cooler through said refrigeration chamber.

2. A rapid-freezing apparatus according to claim 1, wherein said flexible traction member comprises a rope and wherein said screen trays include a single clamp attaching said trays to said rope.

3. A rapid-freezing apparatus according to claim 2, wherein the side of said trays having said single clamp includes a projecting member positioned to contact said rope during linear motion thereof.

4. A rapid-freezing apparatus according to claim 1, wherein said flexible traction member has a run that extends outside of said refrigeration chamber so that said screen trays can be cleaned, loaded, and unloaded outside of said chamber.

* * * * *